United States Patent [19]
Frank et al.

[11] 3,867,344
[45] Feb. 18, 1975

[54] BURN-RESISTANT PLASTIC COMPOSITIONS

[75] Inventors: Victor S. Frank, Silver Spring; Edwin W. Lard, Bowie; Eldon E. Stahly, Ellicott City, all of Md.

[73] Assignee: W. R. Grace & Co., New York, N.Y.

[22] Filed: Feb. 16, 1971

[21] Appl. No.: 372,701

Related U.S. Application Data

[62] Division of Ser. No. 817,144, April 17, 1969, Pat. No. 3,641,193.

[52] U.S. Cl. ............ 260/47 EN, 260/2 P, 260/2 N, 260/2 EC, 260/18 PF, 260/47 EC, 260/59, 260/77.5 AR, 260/830 R, 260/830 TW, 260/831, 260/834, 260/835

[51] Int. Cl. ............................................ C08g 30/14

[58] Field of Search... 260/2 EP, 2 EC, 2 N, 47 EN, 260/47 EC, DIG. 24, 2 P, 59, 18 PF

[56] References Cited
UNITED STATES PATENTS

| | | | |
|---|---|---|---|
| 2,412,055 | 11/1968 | Koral | 260/834 |
| 3,372,208 | 3/1968 | Waters et al. | 260/830 TW |
| 3,565,861 | 2/1971 | White | 260/47 |

OTHER PUBLICATIONS
Handbook of Epoxy Resins Lee et al. 1967 (p. 5–32; 5–37).

*Primary Examiner*—Melvin Goldstein
*Assistant Examiner*—T. Pertilla
*Attorney, Agent, or Firm*—Richard P. Plunkett; Kenneth E. Prince

[57] ABSTRACT

Solid burn-resistant polymeric compositions are formed by reacting substances such as $Cl(PNCl_2)_9PCl_4$ and $(PNCl_2)_{3-4}$ with epoxy resins to form $PNCl_2$-epoxy pre polymers. These prepolymers are blended with orgainc liquid prepolymers such as phenolics, epoxies, polyurethanes and polyesters and the blends are cured to form fire resistant plastics, wherein initial P,N, and Cl contents are wholly retained. Those two components, i.e., $PNCl_2$ component and epoxy resin are admixed with liquid organic prepolymers (and polymerization catalysts therefor) and the system is then cured, usually by heating, whereby the $PNCl_2$-epoxy polymer is formed in situ along with the matrix polymer, or in some cases chemically bonded to the organic polymeric cross-linked plastic.

2 Claims, No Drawings

BURN-RESISTANT PLASTIC COMPOSITIONS

This is a division of application Ser. No. 817,144, filed Apr. 17, 1969 and now U.S. Pat. No. 3,641,193.

BACKGROUND OF THE INVENTION

1. Objectives of the Invention

An objective of this invention is to produce burn-resistant polymeric compositions. Other objectives will be obvious to those skilled in the art from a reading of the following specification and claims.

2. Prior Art

It has been reported that unsaturated alkyd resins have been treated with polyphosphonitrilic chlorides and styrene to supposedly improve the fire extinguishing properties. Partly or completely hydrolyzed or ammonolyzed polyphosphonitrilic chlorides are reported to be effective flame proofing materials.

BROAD DESCRIPTION OF THE INVENTION

This invention encompasses a process for preparing a solid burn-resistant polymeric composition. The process includes admixing a material selected from the class consisting of (i) a cyclic $(PNX_2)_y$, where $y$ is at least three and where X is a halogen atom, (ii) $PX_3$, where X is a halogen atom, (iii) $PX_5$, where X is a halogen atom, (iv) $POX_3$, where X is a halogen atom and (v) linear $X(PNX_2)_yPX_4$, where $y$ is at least one and where X is a halogen atom; a compound or resin containing at least two epoxy groups; an organic prepolymer which includes at least one monomer; and a polymerization catalyst for said organic prepolymer. The process further includes curing the prepolymer mixture system at a temperature between about 0° and about 250°C. The $PNX_2$ material, etc., cures the epoxy-containing compound or resin when rates are not controlled by cooling. HX formed in the reaction is not released but is retained in the system via reaction with an epoxy or hydroxy group of the epoxy resin and thus enhances the fire resistance of the polymeric composition. The prepolymer mixture is simultaneously cured by the polymerization catalyst to form a flame-resistant polymeric composition. This process can be used to increase the flame-resistance of polymers with which the $PNCl_2$-epoxy composition is compatible. There may or may not be chemical bonding between the $PNCl_2$-epoxy polymer and the other polymers in flame-resistant polymeric compositions.

Preferably the $PNCl_2$-epoxy-containing compound and the organic prepolymer are liquid at the mixing and curing temperatures. The cyclo-$PNCl_2$ polymers are solid but form liquid mixtures with some of the epoxy resins. Preferably, basic accelerating materials are added to the formulations when linear or cyclic $PNCl_2$-polymers are used.

This invention also encompasses the above process which is modified by separately preparing the solid $PNCl_2$-epoxy polymer, reducing the polymer to small particles, and admixing the particles with either a solid or liquid organic prepolymer and catalyst therefor. The prepolymer mixture is then cured.

The products of both of the above processes are encompassed within the scope of this invention.

DETAILED DESCRIPTION OF THE INVENTION

Examples of polyphosphonitrilic chlorides which are useful as starting materials are: $(PNCl_2)_3$, m.p.=114°C.; $(PNCl_2)_4$, m.p.=123.5°C; $(PNCl_2)_5$, m.p.=40.5°C to 41°C; $(PNCl_2)_6$, m.p.=90° to 91°C; $(PNCl_2)_7$, m.p.=8° to 12°C; $(PNCl_2)_8$, m.p.=57° to 58°C; $(PNCl_2)_{11}$; etc. The mixture of $(PNCl_2)_3$ and $(PNCl_2)_4$, containing 60 to 70 mole percent of the trimer, has a m.p. of 88.5° to 89°C and is also useful. This invention also encompasses the use of other polyphosphonitrilic halides and mixed halides, such as $(PNF_2)_3$, m.p.=27.8°C; $(PNF_2)_4$, m.p.=30.4°C; $P_3N_3Cl_2F_4$; $P_3N_3ClF_5$; $P_4N_4Cl_2F_6$, m.p.=21°C; $(PNBr_2)_3$, m.p.=191.5°C; $P_3N_3BrCl_5$, m.p.=123°C; $P_3N_3Br_2Cl_4$, m.p.=132°C; $P_3N_3Br_4Cl_2$, m.p.=168°C; $P_4N_4Br_8$, m.p.=202°C; $P_4N_4FCl_7$, m.p.=63°C; $P_4N_4F_3Cl_5$, m.p.=10°C; $P_4N_4F_5Cl_3$, m.p.=−28°C; $(PNFCl)_4$, m.p.=−23°C; $P_4N_4F_2Cl_6$, m.p.=23°C; $P_4N_4F_7Cl$, m.p.=−50°C; $(PNF_2)_5$, m.p.=−50°C; $(PNF_2)_6$, m.p.=−45.5°C; $(PNF_2)_7$, m.p.=−61°C; $(PNF_2)_8$, m.p.=−17°C; $(PNF_2)_9$, m.p.=−78°C; $(PNF_2)_{10}$, m.p.=−51°C; $(PNF_2)_{11}$, m.p.=−78°C; etc. Mixtures of the various compounds can be used as starting materials in preparing the phosphonitrilic polymers having at least two reactive end groups.

The trimer and the tetramer of $(PNCl_2)_y$ have cyclic structures. $(PNBr_2)_3$, $(PNF_2)_3$, +$(PNF_2)_4$ also have cyclic structures. It is reported that the fluorides and chlorides up through $(PNF_2)_{17}$ and $(PNCl_2)_{17}$ have ring structures.

The polymeric phosphonitrilic chlorides $(PNCl_2)_3$ to $_{17}$ are prepared by the reaction of phosphorus nitrides with chlorine, by heating phosphorus pentachloride with solid ammonium chloride at 145° to 160°C, by heating $PCl_5$ and $NH_4Cl$ in o-dichlorobenzene solution, or by other methods well known to those skilled in the art. A method for preparing an admixture of $(PNCl_2)_3$, 75 percent, and $(PNCl_2)_4$, 25 percent and separating the components, is given on page 229 of Gefter E. L., *Organophosphorus Monomers and Polymers*, associated Technical Services, Inc., N.J., (1962).

$X[PNX_2]_yPX_4$ where $y$ equals one to 45 and X is a halogen atom, is the general formula for the series of liquid linear polyphosphonitrilic halides. Preferably, the linear $PNCl_2$ polymers have a molecular weight between 400 and 50,000. Examples of $Cl[PNCl_2]_yPCl_4$ are: $Cl_3P=NPCl_4$; $Cl_3P=NPCl_2=NPCl_4$; $Cl_3P=NPCl_2=NPCl_2=NPCl_2$; $Cl[PNCl_2]_4PCl_4$; $Cl[PNCl_2]_6PCl_4$; $Cl[PNCl_2]_8PCl_4$; $Cl[PNCl_2]_{10}PCl_4$; $Cl[PNCl_2]_{11}PCl_4$; $Cl[PNCl_2]_{15}-PCl_4$; etc.

It should be noted that linear polymers which have the formula:

are probably in the following form:

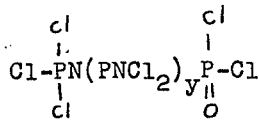

after even brief exposure to the atmosphere.

As used herein, the terms polyphosphonitrilic halides and phosphonitrilic halide polymers encompass cyclic polymers of the class $(PNX_2)_y$, where $y$ is 3 to 17 and X is a halogen atom, and linear polymers of the class $X(PNX_2)_yPX_4$, where $y$ is at least one and X is a halogen atom.

Useful examples of $PX_3$, where X is a halogen atom are: $PCl_3$, $PBr_3$, $PF_3$, $PI_3$, $PF_2Cl$, $PF_2Br$, etc. Useful examples of POX$_3$, where X is a halogen atom are: POCl$_3$, POF$_3$ etc. Useful examples of PX$_5$, where X is a halogen atom are: PCl$_5$, PBr$_5$, PCl$_5$, PF$_3$Cl$_2$, PF$_3$Br$_2$, etc.

An epoxy group is

This invention includes materials termed epoxy resins and epoxy compounds. This invention requires that those compounds have at least two epoxy groups so that polymeric structures can be obtained. Liquid epoxy compounds and resins are preferred. Examples of useful epoxy resins are the reaction products of epichlorohydrin with bisphenol A, the novolak resins, the aliphatic glycols, and polyglycols, etc,; bis-p, p'hydroxyphenyl sulfone; and so forth.

The amount of cyclic or linear PNCl$_2$ polymer, etc., admixed with the epoxy resins should be a stoichiometric amount but can range from about 0.1 to about two equivalent parts based upon an equivalent part of epoxy resin. Obviously a high degree of fire-resistance requires a high content of PNCl$_2$ polymer.

The reaction of the PNCl$_2$ polymers, either cyclic or linear, are postulated to react difunctionally in curing the epoxy resin. When (PNCl$_2$)$_3$ is employed, the following reaction is thought to occur:

er-epoxy resin reaction product components are added to polyester resins, cure does not readily occur without the presence of a basic accelerating material, e.g., N,N-dimethyl aniline. Addition of linear PNCl$_2$ polymer must be carefully controlled to avoid an autoaccelerative reaction which produces decomposition temperatures.

Cyclic (PNCl$_2$)$_3$ or $_4$ polymer does not react with epoxy resins up to 165°C. However, if a quaternary hydroxide or salt (e.g., benzylphenyldimethylammonium chloride or trimethylbenzylammonium hydroxide) is added in trace amounts, a cured epoxy resin results at 100° to 135°C. Thus the uncured mixture of cyclic PNCl$_2$ polymers and epoxy resins can be added to other uncured polymer systems (e.g., polyesters, phenolic, polyurethanes) and if quaternary ammonium salt or hydroxide is present together with the usual curing agents for the respective resin systems, the cure of the cyclic PNCl$_2$-epoxy resin occurs in situ during the cure of the matrix resin, and a non-burning product results.

The materials to form the PNCl$_2$-epoxy reaction product are added to the organic prepolymer system and catalyst therefore, so that an intimate admixture can be obtained by in situ formation of the epoxy reaction product and the polymer. Preferably the organic prepolymer system and the materials to form the epoxy reaction product are liquids at the mixing and curing

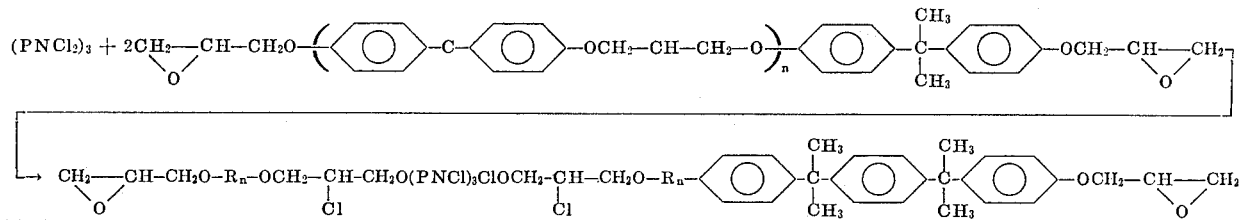

where R is the parenthetical portion of one of the reactants in the above formula; or P$_3$N$_3$Cl$_6$ + resin = (CHOH)$_2$ ⟶ 2HCl + P$_3$N$_3$Cl$_4$ = (OCH)$_2$ = Resin followed by

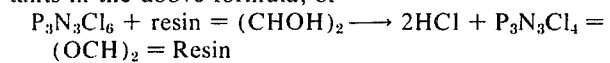

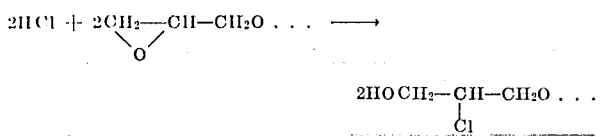

or, finally one chlorine substituent of the (PNCl$_2$)$_3$ may react with an epoxy group and the second chlorine may react with a hydroxy group. In any event no HCl should be lost from the system, therefore the total fire-retardant value if the PNCl$_2$ moieties is retained.

Similar reactions can occur between PNCl$_2$ polymers and epoxy novolac resins or simple phenol-formaldehyde resins, polyurethanes, and between PNCl$_2$ polymers and other resins containing active hydrogens. Also the PCl$_5$, PCl$_3$, etc., phosphorous cross-linking agents are visualized as reacting with active H compounds and epoxy groups. Epoxy compounds are particularly advantageous because of their HCl scavenging ability.

Linear PNCl$_2$ polymer will cure epoxy resins without addition of a basic catalyst, by heating the mixture, usually above 100°C. However, when linear PNCl$_2$ polymtemperatures. The amount of materials (to form the epoxy reaction product) in the mixture of the organic prepolymer system, catalyst therefore and said materials is within the range of about 15 to about 99 percent by weight and preferably between about 20 to about 50 percent by weight.

The useful organic prepolymer systems include uncured epoxies, polyester prepolymers, polyamide prepolymers, phenolic prepolymers, polyurethane prepolymers, low melting ureaformaldehyde prepolymers, melamine-HCHO prepolymers, polyimide prepolymers, polycarbonate prepolymers, polyphenylene oxide prepolymers, etc.

Various useful polyester resin compositions are given in the following paragraphs.

The preferred unsaturated polymerizable mixtures to be cured by the process of this invention G—conventional classes of resins known in the prior art. The most preferred polyester resins are prepared by the esterification of alpha, beta-unsaturated polybasic acids, and dihydric alcohols. Certain compounds of this type may be indicated generically as follows: —M—G—M—G—M—G where, —M— represents an unsaturated dibasic acid residue and —G— represents a dihydric alcohol residue. Modifying dibasic acids may also be used in the polyester resin compositions. Representative dihydric alcohols and unsaturated polybasic acids are shown below.

In preparing unsaturated polyesters which may be employed in the practice of the present invention, the alcohol component may comprise ethylene glycol, diethylene glycol or propylene glycol, or one of the group of solid polyethylene glycols designated as "Carbowax". Polyethylene glycols such as the Carbowaxes are understood to have molecular weights above 300.

The acid component usually comprises an alpha, beta-ethylenically unsaturated polycarboxylic acid such as maleic, fumaric or itaconic acid, or the well-known derivatives of these polycarboxylic acids having ethylenic unsaturation in alpha-beta relation to the carboxyl group. Polybasic acids such as aconitic acid, tricarballylic acid or citric acid may also be employed. A plurality of such acids also may be mixed with each other, if so desired. In many instances, it may be desireable to include a dicarboxylic acid free of ethylenic unsaturation. Examples of this latter type of dicarboxylic acid include phthalic acid or terephthalic acid, which although they contain double bonds in the benzene ring, do not undergo addition reaction with monomer compounds and may, therefore, be considered as being the equivalent of saturated compounds. Likewise, aliphatic dicarboxylic acids such as succinic acid, adipic acid, sebacic acid, or azelaic acid may be substituted for a part of the alpha, beta-ethylenically unsaturated dicarboxylic acid. The proportion of the non-ethylene acid with respect to the alpha, beta-ethylenically unsaturated acid is susceptible of wide variation. A molecular proportion of 0.25 to 12 moles of saturated acid per mole of unsaturated acid is usually used for commercial applications. Also acid anhydrides of these dicarboxylic acids can be used instead of the dicarboxylic acids.

Examples of ethylenically unsaturated monomers are:

1. Monoolefinic hydrocarbons, that is, monomers containing only atoms of hydrogen and carbon, such as styrene, alpha-methyl styrene, alpha-ethyl styrene, alpha-butyl styrene, vinyl toluene, and the like;

2. Halogenated monoolefinic hydrocarbons, that is, monomers containing carbon hydrogen and one or more halogen atoms such as alpha-chlorostyrene, alpha-bromostyrene, 2,5-dichlorostyrene, 2,5-dibromostyrene, 3,4-dichlorostyrene, 3,4-difluorostyrene, ortho-, meta- and para-fluorostyrenes, chloroethylene (vinyl chloride), 1,1-dichloroethylene (vinylidene chloride), and the like;

3. Esters of organic and inorganic acids such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl-o-chlorobenzoate, vinyl p-methoxybenzoate, vinyl p-ethoxybenzoate, methyl methacrylate, ethyl methacrylate, methyl crotonate, ethyl crotonate, methyl acrylate, ethyl acrylate, hepty acrylate, octyl acrylate, isopropenyl propionate, isopropenyl benzoate, isopropenyl o-bromobenzoate, vinyl alpha-bromoacetate, vinyl alpha-chloropropionate, vinyl alpha-iodopropionate, allyl formate, allyl acetate, allyl chloroacetate, allyl chlorovalerate, methyl alpha-chloroacrylate, diallyl phthalate, and the like;

4. Organic nitriles such as acrylonitrile, methacrylonitrile, ethacrylonitrile crotonitrile, and the like;

5. Acid monomers such as acrylic acid, methacrylic acid, crotonic acid, 3-butenoic acid, angelic acid, tiglic acid and the like;

6. Amides such as acrylamide, alpha-methyl acrylamide, N-phenyl acrylamide, N-methyl-N-phenyl acrylamide, N-methyl acrylamide, and the like.

The preferred monomers are liquid compounds soluble in the polyester component. They will contain the $C=CH_2$ group and preferably the latter will be attached to a negative radical such as a benzene ring, a chlorine atom, an ester linkage, a nitrile group or the like. They should be free of carbon-carbon conjugated double bonds.

The most preferred polyesters are the burn-resistant type wherein halogenated aromatic acid anhydrides or halogenated endomethylenecyclohexane dicarboxylic anhydrides are added as part of the dibasic acid moiety.

The curing time of the organic prepolymer systems varies between about 1 minute and about 24 hours. This time span depends, in part, upon the type of organic prepolymer system, the amount of catalyst, and so forth. The curing temperature for example of the polyester prepolymer systems varies between about 15°C and about 250°C.

The type of catalyst promotor which can be used in those systems is extensive. One of the promotor types which can be used in the polyester prepolymer systems is a cobalt salt which is capable of being dissolved in the resinous composition. Suitable soluble cobalt octoate or any other higher fatty acid salt of cobalt. The amount of cobalt salt can be varied from about 0.001 to 0.3 percent of the salt calculated as dissolved metallic cobalt based on the total weight of the resin components, catalyst and promotor mixture employed. The vanadium promotors disclosed in U.S. Pat. No. 3,333,021 are useful. Another promoter type material is a variety of amine promoters. Suitable amine promoters are disclosed in U.S. Pat. No. 2,480,928.

The organic prepolymer systems of this invention can also contain other compatible additives, such as fillers (silica, carbon black, etc., dyes), reinforcing materials (asbestos, chopped glass fibers), etc.

As an alternative method the materials (preferably liquid) to form the epoxy reaction product can be admixed, cured, and reduced in size. The particles can then be admixed into the organic prepolymer system and catalyst therefore, which in turn is cured. The range of ingredients is the same as in the other method of preparation.

The term solution, as used herein, encompasses disperions, solutions, suspensions, colloids, etc.

The following examples will aid in explaining, but should not be deemed as limiting, the instant invention. In all cases, unless otherwise noted, all parts and percentages are by weight.

EXAMPLE 1

Two parts by wt. of liquid linear $PNCl_2$ polymer [about 1100 average mol. wt. and represented by the formula {$Cl(PCl_2=N)P(O)Cl_2$}] was gradually added to 8 parts by wt. of Epon Resin 828 (Shell Chemical Co. product having about 200 equivalent weight per epoxy function) while stirring vigorously. Slow addition over 5 minutes prevented the temperature from rising above 80°C. from heat of reaction. The mixture was then placed in an oven at 100°C. and curing occurred overnight (16 hours). The cured product was non-burning, i.e., after 30 seconds ignition, the resin self-extinguished within 2 or 3 seconds (ASTM D-635).

EXAMPLE 2

Example 1 was repeated except that the linear PNCl$_2$ polymer and Epon 828 were poured together and then stirred. The exothermicity of the reaction resulted in excessive temperatures and a "run-away" reaction. Only a black charred product remained.

EXAMPLE 3

Example 1 was repeated using 5 parts by weight of the same batch of linear PNCl$_2$ polymer and 10 parts by weight of Epon Resin 828. The cured product was immediately self-extinguishing in the same buring test.

EXAMPLE 4

Example 1 was repeated using 10 gm. of the same PNCl$_2$ polymer and 10 gm. of the same resin. The cured product was self-extinguishing in the burning test (ASTM-D635).

EXAMPLE 5

Example 4 was repeated except that the liquid prepolymer was not cured. The liquid was blended with a maleic-phthalic acid-glycol polyester ("Clear Cast" polyester, American Hanidcrafts' Company, Ft. Worth, Texas) in the ratio of 40 parts (PNCl$_2$)$_n$-Epon liquid 60 parts of polyester resin. Curing was conducted by adding 1 percent methylethylketone peroxide catalyst (based on the weight of the mixed resins and additives), and 1 percent cobalt octoate solution (12 percent cobalt). Curing did not begin until 1 percent by weight of dimethylaniline was stirred in. After standing overnight, a rigid cure was obtained. The sample was self-extinguishing in one second by ASTM D-635.

EXAMPLE 6

Twenty parts by weight of linear (PNCl$_2$)$_9$ (end groups probably Cl and POCl$_2$) were blended with 80 parts by weight of the same Clear Cast polyester employed in Example 5. The mixture required 1 part N,N-dimethyl aniline (DMA) (a basic material) and 3 parts by weight methylethylketone peroxide catalyst (50 percent active) and 1 part cobalt octoate solution for curing. The cured product was self-extinguishing and retained considerable flexibility. It was immediately self-extinguishing after the 30 seconds ignition test.

EXAMPLE 7

Example 6 was repeated except that 10 parts of linear (PNCl$_2$)$_9$ and 90 parts Clear Cast polyester was used. A hard cured resin resulted which self-extinguished in the 10-second ignition test.

EXAMPLE 8

An example similar to 6 was run in an attempt to improve the rigidity and strength of the cured resin. Epon 828 (10 parts by weight) was admixed with 10 parts Clear Cast resin and 20 parts of (PNCl$_2$)$_9$ polymer as in Example 6, was stirred in to give a clear composition. When cured by the same peroxide-DMA-cobalt octoate formulation, as in Example 6, the resin was rigid after 24 hours, had high strength, and was flame-resistant (self-extinguishing).

(Example 8 above, and Examples 9, 10, 11 and 12 represent in situ formation or curing of the linear polyphosphonitrilic chloride-epoxy resin reaction product in liquid prepolymers which are cured themselves and require compatible flame or burn-resistant components.)

EXAMPLE 9

In a preparation similar to that of Example 6, 20 parts by weight of cyclic (PNCl$_2$)$_{3-4}$ was used instead of the linear PNCl$_2$ polymer (about 1100 mol. wt.). The cured product was flexible after 24 hours as was the cured product of Example 6. It was also self-extinguishing in one second after a 30-second ignition.

EXAMPLE 10

Product of Example 9 was too flexible and weak to be of value in certain applications, so a preparation was made to improve the rigidity and strength of the polyester composition of Example 9. 70 parts Clear Cast Resin, 20 parts cyclic-(PNCl$_2$)$_{3-4}$ polymer and 10 parts Epon Resin 828 were well mixed and were cured with the same formula as in Example 9, i.e., 3 parts by weight of 50 percent methyl ethyl ketone peroxide, 1 part N, N'-dimethylaniline and 1 part cobalt octaote solution (12 percent cobalt). After 24 hours a rigid cured clear green-tinted resin obtained. It was immediately self-extinguishing by the 30-second ignition test. (ASTM D-635).

EXAMPLE 11

85 parts by weight of polyester resin (Clear Cast), 10 parts cyclic (PNCl$_2$)$_{3-4}$ polymer and 5 parts Epon 828 epoxy resin were combined and cured as in Example 10. The product after 24 hours passed the 15-second ignition test (self-extinguished). This example shows that more than 10 percent by weight of cyclic (PNCl$_2$)$_{3-4}$ is needed in plastic compositions for effective fire-resistance.

EXAMPLE 12

Example 11 was repeated except that 75 parts by weight of polyester resin, 10 parts by weight of Epon 828 and 15 parts by weight of cyclic (PNCl$_2$)$_{3-4}$ polymers were used. The mixture was cured overnight, using the formula of Example 10. The product was self-extinguishing by ASTM D-635 test.

EXAMPLE 13

Six parts by weight cyclic PNCl$_2$ polymer (about 1100 average M.W.) was stirred into 10 parts by weight Epon Resin 1001 (sold by Shell Chemical Co. and has an epoxy equivalent weight of about 475) after melting at about 70°C. At 120°C the PNCl$_2$ polymer began to sublime out of the mixture; 0.1 ml. of a 40 percent methanol solution of benzyl trimethylammonium hydroxide was stirred in, and the mixture was set in an 135°C. oven for 2 hours. The cured sample was immediately self-extinguishing by the burning test designated in Example 12.

EXAMPLE 14

Example 13 was repeated except that the cyclic PNCl$_2$ polymer was omitted. Curing occurred slowly at 135°C. after initiation with the quaternary ammonium hydroxide solution. A good hard cure resulted in 18 hours. The product readily burned after 15 seconds' ignition until the sample was completely consumed.

EXAMPLE 15

Fifteen parts by weight of Shell Epon Resin 828 was warmed to 90°C. and 5 gm. of cyclic $PNCl_2$ polymer mixture of tri- and tetra-phosphonitrilic chloride was stirred in. The mixture did not cure in 65 hours at 90°C. The temperature was increased to 135°C. for 4 hours. No cure occurred. Temperature was raised to 155°C. for 16 hours. The mixture was still quite fluid. The mixture was cooled to 100°C. and 0.1 part by weight of butanol was added. After 24 hours at 100°C., no cure was obtained and 0.10 parts triethanolamine was added. After 4 hours at 125°C. it was heated at 155°C. for 18 hours. A hard clear cured sample was obtained which contained only 10 percent $PNCl_2$ additive; almost 3.5 parts by weight of the cyclic $(PNCl_2)_{3-4}$ polymer had sublimed out of the mixture. This cured resin was still self-extinguishing, burning for 10 seconds after a 30-second ignition by ASTM D-635 method. This example demonstrates that alcohol does not catalyze the cure of cyclic $PNCl_2$ polymer-Epon resin combination. A base is required to catalyze that combination.

EXAMPLE 16

Epon Resin 1001 (m.p. 64°–76° C.) was weighed out in the amount of 20 grams and melted. One gram of N,N'-tetramethylenediamine was added for curing. The mixture was heated for 16 hours at 90°C. and for 2.5 hours at 135°C. The product was a clear strong resin which did not break when hurled against a marble bench top. The resin was classified as "burning" in ASTM D-635 test since burning continued until the sample was completely consumed. This example demonstrated the action of the base in accelerating curing in the absence of the $PNCl_2$ additive and demonstrated the need of the $PNCl_2$ additive.

EXAMPLE 17

Epon resin 828 (16.2 parts by weight) was admixed with 11:3 gm. of linear $PNCl_2$ polymer taking precautions not to allow the temperature of the reaction to exceed 60°C. by very gradual addition of the linear $PNCl_2$ polymer. About 11 parts by weight of this mixture were combined with 0.11 part by weight of trimethylbenzylammonium hydroxide as catalyst, which was found necessaary when cyclic $PNCl_2$ polymers were reacted with epoxy resins. Nothing was added to the remainder of the mixture. Both samples were cured after heating for 1.5 hours at 200°F. followed by heating for 2.5 hours at 275°F. Both samples were immediately self-extinguishing by ASTM D-635 test. This example shows that no catalyst is required for reaction and curing of linear $PNCl_2$ epoxy resin mixtures.

EXAMPLE 18

14.2 parts by weight of epoxy resin (Epon 828) were weighed into an aluminum pan. While stirring with a magnetic stirrer, 10.2 parts by weight of linear $PNCl_2$ polymer (having a molecular weight of about 1100 and represented by the formula $[Cl(-PCl_2=N-)_nP=(O)Cl_2]$ was added over a period of 10 minutes. The temperature rose to 60°C. The liquid product (designated sample A) contained 42 percent linear $PNCl_2$ polymer.

To 20.9 parts by weight of Clear Cast polyester, 4.6 parts by weight of sample A were added. The mixture was stirred. The mixture (designated sample B) contained 1.9 parts by weight of 8.3 percent linear $PNCl_2$ polymer. To sample B was added 1 part by weight of methylethylketone peroxide, 0.25 parts by weight of cobalt octoate solution (12 percent cobalt), 0.4 part by weight of benzyltrimethylammonium hydroxide (added as 40 percent solution in methanol), and 1 part by weight N,N-dimethylaniline. The resultant mixture was stirred well at 85°C. and then set aside to cure. After 40 hours, the sample was still flexible and soft. The cure was completed in 3 hours at about 200°F. The product was self-extinguishing after 10 seconds' ignition, but was classified as burning after 15 seconds' ignition.

Twenty parts of Sample A was sprinkled with 0.2 parts by weight of benzyldimethylphenylammonium chloride and was placed in a 200°F. oven for 3 hours. A hard cured sample resulted which proved to be immediately self-extinguishing after 30 seconds' ignition. Thus 8 percent $PNCl_2$ additive gives considerably less fire-resistance than desired. On the other hand, 42 percent $PNCl_2$ additive in the epoxy resin is much higher than necessary for good flame resistance. Also, the cure can be accelerated with a quaternary salt.

EXAMPLE 19

3.5 grams of the linear $PNCl_2$ polymer used in Example 18 was gradually added with stirring to 12.6 parts by weight of epoxidized Soya oil (from Union Carbide) at a rate slow enough to avoid a "runaway" reaction. The mixture was cured by heating for 2 hours at 90°C. followed by heating for 2 hours at 135°C. A hard brown product resulted which extinguished immediately by the ASTM D-635 test.

EXAMPLE 20

The cyclic $(PNCl_2)_{3-4}$ was mixed with epoxidized Soya oil in the weight ratio of 9.55 parts to 9.3 parts. To the mixture was added with stirring 1.75 ml. of 40 wt. percent benzyltrimethylammonium hydroxide. After an hour of heating at 90°C. the mixture was heated at 135°C. for 3 hours. The cured product was very hard. By ASTM method D-635 the cured resin self-extinguished in less than 1 second after 30 seconds' ignition.

EXAMPLE 21

25 parts by weight of the uncured mixture of Example 21 (cyclic $PNCl_2$ polymer and epoxy resin) was blended with a 100 parts by weight molten novolak resin at 100°C. (The novolac resin was prepared by refluxing 130 parts by weight of phenol, 92.4 parts by weight of 37 percent aqueous formaldehyde and 1 part by weight oxalic acid dihydrate for 30 minutes; another part by weight of oxalic acid hydrate was then added and refluxing was continued for 1 hour; 400 parts by weight of water was added and the mixture was cooled and settled, the water layer decanted, and then vacuum distillation was used to remove water until 120°C. pot temperature was reached). To the mixture was added 2.5 parts by weight of a 40 percent solution of benzyltrimethylammonium hydroxide. The mixture was cured by heating at 150°C. for 1 hour. The cured product after 24 hours was self-extinguishing in ASTM D-635 tests.

EXAMPLE 22

To 19 grams of Epon 828 resin 2.1 gm. of $PCl_3$ was added with stirring. After 64 hours of heating at 90°C., the curing was not complete so 1.5 gm. $PCl_3$ was stirred into the mixture. After 3 hours of heating at 135°C., the sample was hard and clear when cooled. The sample is immediately self-extinguishing by test ASTM D-635.

EXAMPLE 23

A mixture similar to that of Example 22 was made using 20 gm. of Epon 828 resin and 4 gm. of $PCl_3$. The mixture was cured by heating for 2 hours at 130°C. The product was immediately self-extinguishing.

EXAMPLE 24

3 parts by weight of $PCl_5$ (solid powder) were thoroughly mixed into 13.6 parts by weight Epon 828 resin. After 5 minutes of stirring at 80°C. a clear solution resulted. The curing conditions included 60 hours at 90°C., 8 hours at 125° to 155°C. and 16 hours at 155°C. The product was found to be immediately self-extinguishing by D-635 tests.

EXAMPLE 25

Ten parts by weight of Epon 828 was carefully blended with 5 parts by weight of linear $PNCl_2$ polymer (about 1100 average mol. wt.) below 60°C. The mixture was mixed with 15 parts by weight of an epoxy-novolac resin (Epon 152) at about 60°C. This was mixed with 3 parts aminoethylpiperazine and stored at 25°C. for 24 hours. It was heated for 1 hour at 150°C. The cooled resin was self-extinguishing in about 1 second by ASTM D-635 tests.

EXAMPLE 26

Example 23 was repeated but 5 gm. of phosphorus oxychloride was used instead of 4 gm. of $PCl_3$. The cured product was immediately self-extinguishing.

EXAMPLES 27 to 34

Example 25 was repeated 8 times, except that the linear $PNCl_2$ polymer was replaced with 5 parts $(PNCl_2)_8$, 4.3 parts cyclic $P_3N_3F_3Cl_3$, 8.5 parts cyclic $P_4N_4Br_8$, 3.5 parts cyclic $(PNF_2)_4$, 6 parts cyclic $P_3N_3Br_2Cl_4$, 3.5 parts cyclic $(PNF_2)_8$, 8 parts $Cl_3PNPCl_4$, and 10 parts $Cl[PNCl_2]_6PCl_4$, respectively. The cured products were immediately self-extinguishing.

EXAMPLE 35

Example 17 was repeated to obtain two cured samples. Each sample was ground into particles having a mean diameter of about 100 microns. 40 grams of each ground sample was admixed with 60 grams of polyester resin A, one gram of Luperson DSW (a 50 percent solution of methylethyl ketone peroxide), 0.1 gram of cobalt octoate (12 percent cobalt) and 0.1 gm. of dimethyl aniline. Polyester resin A was prepared from propylene glycol and a mixture of maleic acid and phthalic anhydride (50/50 on a mole basis). Cures of each sample occurred at ambient conditions. After 8 hours of standing, the two polyester samples were self-extinguishing by the ASTM D-635 test.

EXAMPLE 36

A reaction product of $PCl_3$-epoxy resin (Epon 828) was obtained from 1 mole (137.5 gm. $PCl_3$) and about 400 gm. of the epoxy resin. The liquid reaction product was obtained by slow combination of the components associated with cooling. Otherwise the exothermicity of the reaction would result in curing to a solid product. (In some cases, a solid can be ground to a powder which can then be blended with other particulate or liquid resins. At present the liquid reaction product is preferred for blending into polyurethanes, novolaks, epoxies and polyesters.) One part of the Epon 828-$PCl_3$ reaction product was blended with two parts of polyester resin A. The mixture was cured by adding 1 gm. cobalt octoate, 1 gm. dimethyl aniline, 1 gm. methyl lithuim, 1 gm. methylethylketone peroxide (Lupersol 224) and 2,5-dihexanoylperoxyhexane (Lupersol 256), and heating the mixture at 150°F. for 3 hours. After standing 24 hours the cured resin self-extinguished after a 15-second ignition (as in the HLT-15- Intermittent Flame Test).

EXAMPLE 37

A prepolymer was prepared as in Example 36, but 400 gm. of Epon 828 and 163.5 gm. of $POCl_3$ (instead of $PCl_3$) was used. One part of the liquid prepolymer was mixed with three parts of diethylene glycol-tolyene diisocyanate reaction product (in a liquid stage). The mixture was cured as in Example 36. The cured mixture (resin) was self-extinguishing by ASTM D-635.

EXAMPLE 38

A prepolymer was prepared as in Example 36, but 400 gm. of Epon 828 and 209 gm. of $PCl_5$ (instead of $PCl_3$) was used. A solid product resulted. One part of the product the product was ground to a powder (5 micron=ave. particle diameter) and then blended with two parts of novolak resin. The mixture was placed in a mold and cured at 200°C. for 1 minute. The cured product was burn-resistant by ASTM D-635.

What is claimed is:

1. A solid polymeric fire-retardant additive consisting essentially of the reaction product of (a) a member of the group consisting of cyclic $(PNX_2)_y$ where X is a halogen atom and $y$ is at least 3 and linear $X(PNX_2)_yPX_4$ where X is a halogen atom and $y$ is at least 1; and (b) a compound containing at least two oxirane groups, the equivalent ratio of (a) to (b) being in the range 0.1–2.0:1.0 respectively.

2. A process for preparing a solid polymeric fire-retardant additive comprising the steps of:
    1. admixing
        a. a member of the group consisting of cyclic $(PNX_2)_y$ where X is a halogen atom and $y$ is at least 3 in combination with a trace amount of a catalytic member of the group consisting of a quaternary hydroxide and quaternary salt and linear $X(PNX_2)_yPX_4$ where X is a halogen atom and $y$ is at least 1, and
        b. a compound containing at least two oxirane groups, the equivalent ratio of (a) to (b) being in the range 0.1–2.0:1.0 respectively, and
    2. heating said admixture at a temperature between about 0° to 250°C whereby material (a) cures said compound (b) thus forming a fire-retardant additive.

\* \* \* \* \*